United States Patent [19]

Palmer

[11] Patent Number: 5,270,362
[45] Date of Patent: Dec. 14, 1993

[54] REFINISH CLEAR COATING OF ACRYLIC ANHYDRIDE POLYMER, A GLYCIDYL COMPONENT AND LOW MOLECULAR WEIGHT HYDROXY POLYESTER

[75] Inventor: George T. Palmer, Wilmington, Del.

[73] Assignee: E. I. Du Pont de Nemours and Company, Wilmington, Del.

[21] Appl. No.: 998,007

[22] Filed: Dec. 29, 1992

[51] Int. Cl.$^5$ ............................................. C08L 33/08
[52] U.S. Cl. .................................... 524/81; 524/315; 524/365; 524/507; 524/513; 525/107
[58] Field of Search ................ 524/81, 315, 365, 507, 524/513, 528; 525/107

[56] References Cited

U.S. PATENT DOCUMENTS

| | | | |
|---|---|---|---|
| 4,732,790 | 3/1988 | Blackburn et al. | 427/407.1 |
| 4,732,791 | 3/1988 | Blackburn et al. | 427/407.1 |
| 4,755,581 | 7/1988 | Blackburn et al. | 528/93 |
| 4,755,582 | 7/1988 | Blackburn et al. | 528/93 |
| 4,798,745 | 1/1989 | Martz et al. | 427/407.1 |
| 4,816,500 | 3/1989 | Corcoran | 523/400 |
| 4,871,806 | 10/1989 | Shalati et al. | 525/108 |
| 4,927,868 | 5/1990 | Schimmel et al. | 523/439 |
| 4,946,744 | 8/1990 | Shalati et al. | 428/500 |
| 5,057,555 | 11/1991 | White et al. | 523/400 |

FOREIGN PATENT DOCUMENTS

| | | |
|---|---|---|
| 1278895 | 1/1991 | Canada . |
| 0134691 | 3/1985 | European Pat. Off. . |
| 0316874 | 5/1989 | European Pat. Off. . |

*Primary Examiner*—Maurice J. Welsh
*Attorney, Agent, or Firm*—Hilmar L. Fricke

[57] ABSTRACT

A coating composition containing a reactive film forming binder and an organic liquid carrier; wherein the binder contains (a) an anhydride acrylic polymer having at least two reactive anhydride groups and contains polymerized monomers of an ethylenically unsaturated anhydride or an ethylenically unsaturated dicarboxylic acid and polymerized monomers of alkyl methacrylate, alkyl acrylate, styrene and any mixtures thereof, wherein the alkyl groups have 1-12 carbon atoms and the polymer has a weight average molecular weight of about 2,000–50,000;

(b) a polymeric glycidyl component having at least two reactive glycidyl groups;

(c) a hydroxyl containing polymeric component of a polyester polyol or a polyester urethane having a weight average molecular weight of about 500–2,500; and the composition contains about 0.5–5% by weight, based on the weight of the binder, of a catalyst; wherein components (a), (b) and (c) are three separate components.

12 Claims, No Drawings

REFINISH CLEAR COATING OF ACRYLIC ANHYDRIDE POLYMER, A GLYCIDYL COMPONENT AND LOW MOLECULAR WEIGHT HYDROXY POLYESTER

FIELD OF THE INVENTION

This invention is related to multicomponent coating compositions for finishing the exterior of automobiles and trucks that have low volatile organic components (VOC).

BACKGROUND OF THE INVENTION

There are a wide variety of multi-component coating compositions available for finishing substrates. Typically with these compositions, the components are mixed together before application and then the resulting composition is applied to a substrate by conventional techniques such as spraying and the composition is cured at ambient temperatures or can be cured at elevated temperatures. These compositions are used to finish original equipment, automobiles and trucks and to refinish automobiles and trucks.

Two component coating compositions of an anhydride containing polymer and a glycidyl component are shown in Corcoran U.S. Pat. No. 4,816,500 issued Mar. 28, 1989. Multiple component coating compositions of an anhydride containing polymer, a gylcidyl containing polymer and a relatively high molecular weight hydroxy containing polymeric component are shown in White et al U.S. Pat. No. 5,057,555 issued Oct. 15, 1991. These compositions form excellent finishes that cure at ambient temperatures but a coating composition is needed particularly for the refinishing of automobiles and trucks that has a low VOC content and retains its spray viscosity for at least 3 hours after mixing the paint without further addition of solvents.

SUMMARY OF THE INVENTION

A coating composition containing about 30–70% by weight of a reactive film forming binder and 70–30% by weight of an organic liquid carrier: wherein the binder comprises about (a) 25–90% by weight, based on the weight of the binder, of an anhydride acrylic polymer that has at least two reactive anhydride groups and contains polymerized monomers of an ethylenically unsaturated anhydride or an ethylenically unsaturated dicarboxylic acid and polymerized monomers of alkyl methacrylate, alkyl acrylate, styrene or any mixtures thereof, wherein the alkyl groups have 1–12 carbon atoms and the polymer has a weight average molecular weight of about 2,000–50,000;

(b) 5–50% by weight, based on the weight of the binder, of a polymeric glycidyl component having at least two reactive glycidyl groups; and (c) 5–50% by weight, based on the weight of the binder, of hydroxyl containing polymeric component of a polyester polyol or a polyester urethane having a weight average molecular weight of about 500–2,500; and the composition contains about 0.5–5% by weight, based on the weight of the binder, of a catalyst; wherein components (a), (b) and (c) are three separate components.

DETAILED DESCRIPTION OF THE INVENTION

The novel coating composition of this invention has a high solids content at a conventional spray viscosity, meets current VOC regulations at spray viscosity, cures at ambient temperatures and forms an automotive quality finish that has excellent adhesion to the substrate to which it is applied, good outdoor weatherability and humidity resistance and an excellent appearance. Also, the composition does not excessively increase in viscosity after mixing of the components for period of time of 3 hours and more such that it remains sprayable with out the addition of solvents. Many of the conventional compositions on standing have an excessive or significant increase in viscosity in a relatively short time and solvent addition is required for spraying which often results in having an excess of VOC which in violation of current standards.

The film forming binder of the coating composition of this invention contains components that are mixed together before application. The film forming binder content of the composition is about 30–70% by weight of an organic carrier which usually is a solvent for the binder.

The composition forms an excellent clear coating over colored pigmented finishes. The coating has good adhesion to the pigmented finish, has excellent humidity resistance and is weatherable and durable. The composition is useful for finishing and refinishing the exterior of automobiles and trucks and the composition can be pigmented to form a colored finish. Also, the composition can be used over plastic substrates used in automobiles and trucks such as filler panels, side panels, fender extensions, moldings and other trim parts.

The composition also can be pigmented to form a colored finish. These pigmented compositions are useful primarily as exterior original equipment and refinish coatings for automobiles and trucks, and are useful as maintenance coatings for tanks, bridges, buildings such as factories and oil refineries and as industrial coatings for appliances, metal cabinets, shelves and the like.

The binder of the composition contains about 25–90% by weight of anhydride acrylic polymer containing at least two anhydride groups, 5–50% by weight of a glycidyl containing component, and 5–50% by weight of a polymeric component containing multiple hydroxyl groups.

The anhydride acrylic polymer has a weight average molecular weight of about 2,000–50,000 determined by gel permeation chromatography using polymethyl methacrylate as a standard and preferably, has a weight average molecular weight of 3,000–25,000 and has a glass transition temperature of about 0°–90° C.

The anhydride acrylic polymer is prepared by conventional techniques in which the monomers, solvent, and conventional catalysts such as t-butyl peroxy acetate are charged into a polymerization vessel and heated to about 75°–200° C. for about 0.5–6 hours to form the polymer.

The anhydride acrylic polymer is formed by polymerizing monomers of alkyl methacrylates, alkyl acrylates or styrene mixtures thereof, where the alkyl groups have 1–12 carbon atoms and ethylenically unsaturated anhydrides (or ethylenically unsaturated dicarboxylic acids which are converted to the acid anhydride during the polymerization).

Preferred anhydride acrylic polymers contain 20–50% by weight of methyl methacrylate, styrene or a mixture of methyl methacrylate and styrene, 25–55% by weight of an alkyl methacrylate or an alkyl acrylate or mixtures thereof where the alkyl groups have 1–12 carbon atoms and 5–55% by weight of a polymerizable ethyleneically unsaturated anhydride.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes such as gamma methacryloyl propyl trimethoxy silane. Also the anhydride acrylic polymer can contain about 0.1–5% by weight of an ethylenically unsaturated acid such as acrylic acid, methacrylic acid, itaconic acid, maleic acid and the like.

Typically useful ethylenically unsaturated anhydrides are as follows: itaconic anhydride, maleic anhydride, isobutenyl succinic anhydride and the like. It is also possible to impart the anhydride functionality to the anhydride acrylic polymer by using the appropriate ethylenically unsaturated dicarboxylic acid which converts to the corresponding acid anhydride by simple heating. Ethylenically unsaturated dicarboxlic acids that can be used are itaconic acid, maleic acid, isobutenyl succinic acid and the like.

Preferred anhydride acrylic polymers are as follows: styrene/butyl methacrylate/butylacrylate/itaconic anhydride, methyl methacrylate/butyl acrylate/itaconic anhydride, butyl acrylate/styrene/maleic anhydride/maleic acid, methyl methacrylate/butyl acrylate/maleic anhydride, styrene/butyl acrylate/methyl acrylate/maleic anhydride, butyl acrylate/butyl methacrylate/styrene/maleic anhydride.

The glycidyl component contains at least two glycidyl groups and is a polymer. Glycidyl methacrylate or acrylate containing acrylic polymers can be used such as random and block polymers of glycidyl methacrylate and an alkyl methacrylate having 1–12 carbon atoms in the alkyl group such as butyl methacrylate and have a weight average molecular weight of about 4,000–7,000. The block polymers can be prepared by anionic polymerization or by group transfer polymerization.

The hydroxy functional polymeric component has a weight average molecular weight of 500–2,500 and has multiple hydroxyl groups. The hydroxyl group containing material can have a hydroxy value of about 50 to 325, and preferably about 150 to 250. Typical, but non-limiting, examples thereof are polymeric polyols such as polyester polyols and polyesterurethane polyols, and mixtures thereof.

The polyester polyol is the esterification product of an alkylene glycol, a dicarboxylic and/or its anhydride and optionally, a polyhydric alcohol having at least three hydrosyl groups. Monocarboxylic acids such as benzoic acid and aliphatic dibasic acids such as adipic acid also can be used. The polyester polyol has an average hydroxyl functionality per molecule of 2–4.

Typical alkylene glycols are ethylene glycol, propylene glycol, 1,4 butane diol, neopentyl glycol dimethanol, 1,6 hexane diol and the like.

Typically polyhydric alcohols having at least three hydroxyl groups are pentaerythritol, trimethylol propane and thrimethylol ethane.

Typical dicarboxylic acids are phthalic acid, isophthalic acid, terephthalic acid and adipic acid, cyclohexane dicarboxylic acid and 1,2 dodecane dioc acid. Phthalic anhydride also can be used.

One useful polyester polyol is the esterification product of pentaerythritol, benzoic acid, neopentyl glycol, isophthalic acid, phthalic anhydride and adipic acid.

Other useful polyester polyols are the reaction product of a lactone and a diol or dialkanol such as the reaction product of caprolactone and cyclohexane dimethanol.

The polyesterurethane polyol is the reaction product of a hydroxyl terminated polyester and a polyisocyanate, preferably, an aliphatic diisocyanate. The polyesterurethane polyol has a hydroxyl number of about 75–200 and preferably 100–150 and has a weight average molecular weight of about 500–2,500 measured using gel permeation chromatography using polymethyl methacrylate as a standard.

The polyester used to form the polyester urethane is the esterification product of an alkylene glycol and an aromatic dicarboxlic acid or its anhydride and optionally, a polyhydric alcohol having at least three hydroxyl groups.

The polyester preferably has a hydroxyl number of 100–200.

Typically polyisocyanates, alkylene glycols, polyhydric alcohols and aromatic dicarboxylic acids or its anhydride are discussed in U.S. Pat. No. 4,614,683.

The advantages of using a low molecular weight hydroxy functional material is that the composition can be reduced to a standard spray viscosity and still remain at a high solids level and have a VOC within the range required by current regulations. Furthermore, the viscosity of the coating composition increases only slightly after the components are mixed together and remains sprayable without further addition of solvents to reduce viscosity. The use of conventional high molecular weight hydroxy functional materials in coating composition results in a significant increased of viscosity upon standing and requires solvents to reduce viscosity to a sprayable level thereby increasing the VOC of the composition often outside of limits set by regulations.

Typical solvents used to prepare the anhydride acrylic polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates, butyl propionate, methyl ethyl ketone, methyl amyl ketone and diisobutyl ketone.

About 0.5–5% by weight, based on the weight of the binder of the coating composition, of a catalyst is added to enhance curing of the composition. Typical catalysts are as follows: triethylene diamine, dialkyl alkanol amines such as dimethyl ethanolamine, diethyl ethanol amine, dimethyl dodecylamine, imidizole, 1-methyl imidzole, 1,2 dimethyl imidizol and the like. In addition, the catalyst can be incorporated in the polymeric chain by using amino functional alkyl acrylates such as 2-diethyl amino ethyl methacrylate, vinyl pyridine, tert-butyl amino ethyl methacryalate and the like.

The catalyst need not be added to the coating composition. After an article is coated, the article is passed into a chamber containing catalyst vapors. Dimethylethanol amine is a catalyst that can be vaporized and used to cure the composition. Also, to achieve curing, the catalyst can be sprayed with the coating composition using a dual spray gun.

Generally, the composition is applied by conventional techniques such as spraying and electrostatic spraying. The resulting coating can be dried and cured at ambient temperatures or can be cured at elevated temperatures of 60° to 200° C. At ambient temperatures, the coating dries to a tack free condition in about 30 minutes and in about 24 hours the coating is substantially cured. In about 5-7 days, the coating is completely cured. Coatings are applied to form a finish about 0.5-5 mils thick, and preferably 1-2 mils thick. The finish has excellent gloss, good adhesion to substrate, excellent weatherability, and high solids.

To improve weatherability of the clear finish of the coating composition, about 0.1-5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1-5% by weight, based on the weight of the binder, of an antioxidant can be added.

Typical ultraviolet light stabilizers that are useful are as follows:

Benzophenones such as hydroxydodecylbenzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4'trihydroxy-4'-alkoxy-benzophenone, 2-hydroxy-4-methoxy-2'-carboxybenzophenone:

Triazoles such as 2-phenyl-4-(2',4'-dihydroxybenzoyl) triazoles, substituted benzotriazoles such as hydroxyphenyltriazoles such as 2-(2'hydroxy-5'-methylphenyl) benzotriazole, 2-(2'hydroxyphenyl) benotriazole, 2-(2'hydroxy-5'-octylphenyl) naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylopropane, t-butyl benzoate of diphenylopropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl) benzene, metal derivatives of 3,5'-di-t-butyl 4-hydroxyphenylpropionic acid, asymmetrical oxalic acid diarylamides, alkylhdroxyphenylthioalkanoic acid esters, dialkylhydroxyphenylalkanoic acid esters of di- and tri-pentaerythritol, phenyl- and naphthlene-substituted oxalic acid diamides, methyl-$\beta$-(3,5-di-t-butyl-4-hydroxyphenyl) propionate, $\alpha,\alpha'$-bis(2 hydroxy-phenyl) diisopropylbenzene, 3,5'-dibromo-2'-hydroxyacetophenone, ester derivatives of 4,4-bis(4'-hydroxy-phenyl) pentaonic acid wherein there is at least one unsubstituted position ortho to the aromatic hydroxyl groups, organophosphorus sulfides such as bis(diphenylphosphinothioyl) monosulfide and bis(diphenyl-phosphinothioyl) dislufide, 4-benzoyl-6-(dialkylhydroxybenzyl) resorcinol, bis(3-hydroxy-4-benzoylphenoxy) diphenylsilane, bis(3-hydroxy-4-benzoylphenoxy) dialkylsilane, 1,8-naphthalimides, $\alpha$-cyano-$\beta,\beta$-diphenylacrylic acid derivatives, bis(2-benzoxazoly) alkanes, methylene malonitriles containing aryl and heteroacyclic substitutes, alkylene bis (dithio) carbamate, 4-benzoyl-3-hydroxy-phenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazasprio (4,5) decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers can be used: 2-[2'-hydroxy-3',5'-1(1-1-dimethyl-propyl) phenyl]-benzotrizole and bis-[4-(1,2,2,6, 6-pentamethyl-piperidyl)]2-butyl-2-[(3,5-t-butyl-4-hydroxyphenyl)methyl]propanedioate. The stabilizers can be used in any ratio however, a 1:1 ratio of benzotriazole to propanedioate is preferred.

Another useful blend of ultraviolet light stabilizers is 2-(benzotriazole-2-VL)-4,6-bis(methyl-ethyl-1-phenyl ethyl) phenol, and 2(3 hydroxy-3,5'-ditert amyl phenyl) benzotriazole.

Generally, when the coating composition of this invention is used as a clear coating, it is applied by conventional spraying techniques, to a color or base coat of an automobile or truck, preferably electrostatic spraying is used. The coatings can be dried at ambient temperatures but preferably for OEM products the coatings are baked at about 60° to 140° C. for about 10 to 40 minutes. In refinishing automobiles and trucks, the clear coating is applied to a color coat and then can be dried at ambient temperatures or baked to form a clear finish. The resulting clear coat or finish is about 1-5 mils thick, preferably 1-2 mils thick, and has excellent gloss, good adhesion to the color coat and excellent weatherability.

The composition can be pigmented to form a colored finish or primer. About 0.1-200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The following examples illustrate the invention. All parts and percentages are on a weight basis unless indicated otherwise. Molecular weights are determined by gel permeation chromatography using polymethyl methacrylate as the standard.

EXAMPLE 1

Anhydride Acrylic Polymer (1)

An anhydride acrylic polymer was prepared by charging the following ingredients into a reaction vessel equipped with a heating mantle, reflux condenser, thermometer and stirrer:

|  | Parts by weight |
| --- | --- |
| Portion 1 | |
| Butyl Propionate | 74.7 |
| Hexyl Acetate | 24.9 |

-continued

| | Parts by weight |
|---|---|
| Portion 2 | |
| Maleic Anhydride monomer | 89.6 |
| Butyl Acrylate monomer | 156.9 |
| Methyl Acrylate monomer | 2.5 |
| Butyl Propionate | 99.6 |
| Hexyl Acetate | 19.9 |
| Portion 3 | |
| Styrene monomer | 107.64 |
| Portion 4 | |
| t-Butyl Peroxyacetate | 24.8 |
| Xylene | 77.2 |
| Portion 5 | |
| Methyl Ethyl Ketone | 34.8 |
| Total | 853.9 |

Portion 1 was charged into the reactor and heated to its reflux temperature of about 140° C. The temperature was held at reflux (about 145° C.) while portions 2, 3 and 4 were added. Addition of portions 2, 3 and 4 were begun at the same time with portions 2 and 3 being added over 180 minutes and portion 4 being added over 200 minutes. This mixture was kept at reflux for 30 minutes beyond the final addition of portion 4 and then cooled to ambient temperature. Once the temperature of the mixture had dropped below 60° C., portion 5 was added.

The resulting polymer solution had a polymer solids of about 62.5%, a Gardner Holdt viscosity of about Z1 measured at 20° C. and a weight average molecular weight of about 8400.

Epoxy Acrylic Polymer (2)

An epoxy acrylic polymer was prepared by charging the following ingredients into a reaction vessel equipped with a heating mantle, reflux condenser, thermometer and stirrer:

| | Parts by weight |
|---|---|
| Portion 1 | |
| Butyl Acetate | 745.0 |
| Ethyl Acetate | 207.0 |
| Toluene | 128.0 |
| Portion 2 | |
| Glycidyl Methacrylate monomer | 1166.0 |
| Butyl Methacrylate monomer | 777.0 |
| 2,2',Azobis(methylbutyronitrile) | 93.0 |
| Butyl Acetate | 280.0 |
| Portion 3 | |
| Butyl Acetate | 72.0 |
| 2,2',Azobis(methylbutyronitrile) | 24.0 |
| Portion 4 | |
| Butyl Acetate | 510.0 |
| Propylene Glycol Monomethyl Ether Acetate | 242.0 |
| Total | 4244.0 |

Portion 1 was charged into the reactor and heated to its reflux temperature of about 110° C. Portion 2 was premixed and added at a uniform rate over a 2 hour period while maintaining the reaction mixture at its reflux temperature. Immediately after portion 2 was completely added, portion 3 was added over a 30 minute period and then the reaction mixture was held at its reflux temperature for an additional 30 minutes. Portion 4 was added and the reaction mixture was cooled to ambient temperature.

The resulting polymer solution had a polymer solids of about 45.7%, a Gardner Holdt viscosity of about B measured at 20° C. and a weight average molecular weight of about 5300.

Hydroxy Acrylic Polymer (3)

An hydroxy acrylic polymer was prepared by charging the following ingredients into a reaction vessel equipped with a heating mantle, reflux condenser, thermometer and stirrer:

| | Parts by weight |
|---|---|
| Portion 1 | |
| Xylene | 745.0 |
| Portion 2 | |
| Styrene | 73.6 |
| Methyl Methacrylate monomer | 98.2 |
| Isobutyl Methacrylate monomer | 221.0 |
| Hydroxyethyl Methacrylate monomer | 98.2 |
| Portion 3 | |
| t-Butyl Peroxyacetate | 11.8 |
| Xylene | 49.1 |
| Portion 4 | |
| t-Butyl Peroxyacetate | 3.0 |
| Methyl Ethyl Ketone | 49.1 |
| Total | 833.0 |

Portion 1 was charged into the reactor and heated to its reflux temperature of about 140° C. Portion 2 was premixed and added at a uniform rate over a 3 hour period while maintaining the reaction mixture at its reflux temperature. Portion 3 was added simultaneously with portion 2 over a 3 hour period. Immediately after portions 2 and 3 were completely added, portion 4 was added over a 1 hour period and then the reaction mixture was held at its reflux temperature for an additional 1 hour.

The resulting polymer solution had a polymer solids of about 58.6%, a Gardner Holdt viscosity of about Z1 measured at 20° C. and a weight average molecular weight of about 10,000.

Hydroxy Polyester Polymer (4)

A hydroxy polyester polymer was prepared by charging the following ingredients into a reaction vessel equipped with a heating mantle, water seperator, thermometer and stirrer:

| | Parts by weight |
|---|---|
| Portion 1 | |
| Xylene | 19.7 |
| Pentaerythritol | 94.2 |
| Benzoic acid | 168.9 |
| Portion 2 | |
| Neopentyl Glycol | 298.1 |
| Isophthalic Acid | 143.7 |
| Phthalic Anhydride | 128.1 |
| Adipic Acid | 63.2 |
| Xylene | 15.3 |
| Portion 3 | |
| Ethyl Acetate | 107.7 |
| Total | 1038.9 |

Portion 1 was charged into the reactor and heated to its reflux temperature of about 190° C. The reactor was heated stepwise to 215° C. and held until an acid number 33 or less was reached. After cooling the reactor to 80° C., portion 2 was added. The reactor was heated to its reflux temperature of about 175° C. and the temperature was then increased stepwise to 215° C. That temperature was held until an acid number of 6 or less was reached. Portion 3 was added after cooling the reactor to 80° C.

The resulting polymer solution had a polymer solids of about 82.0%, a Gardner Holdt viscosity of about Z2 measured at 20° C. and a weight average molecular weight of about 1600.

Hydroxy Polyester Polymer (5)

A hydroxy polyester polymer was prepared by charging the following ingredients into a reaction vessel equipped with a heating mantle, reflux condenser, thermometer and stirrer:

|  | Parts by weight |
|---|---|
| Portion 1 | |
| Caprolactone | 545.6 |
| Portion 2 | |
| Cyclohexane Dimethanol | 344.6 |
| Portion 3 | |
| Dibutyl Tin Dilaurate | 0.1 |
| Portion 4 | |
| Xylene | 1.0 |
| Total | 891.3 |

Portions 1, 2, 3 and 4 were charged into the reactor and heated to about 155° C. for 4 hours.

The resulting polymer solution had a polymer solids of about 97.0%, a Gardner Holdt viscosity of about U measured at 20° C. and a weight average molecular weight of about 650.

Hydroxy Polyester Polymer (6)

A hydroxy polyester polymer was prepared by charging the following ingredients into a reaction vessel equipped with a heating mantle, reflux condenser, thermometer and stirrer:

|  | Parts by weight |
|---|---|
| Portion 1 | |
| Caprolactone | 628.2 |
| Portion 2 | |
| Cyclohexane Dimethanol | 264.6 |
| Portion 3 | |
| Dibutyl Tin Dilaurate | 0.1 |
| Portion 4 | |
| Xylene | 1.1 |
| Total | 894.0 |

Portions 1, 2, 3 and 4 were charged into the reactor and heated to about 165° C. for 4 hours.

The resulting polymer solution had a polymer solids of about 98.0%, a Gardner Holdt viscosity of about U measured at 20° C. and a weight average molecular weight of about 800.

Clear coating compositions were made by blending the anhydride acrylic polymer, the epoxy acrylic polymer prepared above with a hydroxy resin or blend of hydroxyl resins and a catalyst. Clear coating compositions A-C were formulated at 44.6% solids.

| CLEAR COATING COMPOSITIONS | | | |
|---|---|---|---|
| | Weight Percent | | |
| Component | A | B | C |
| Anhydride Acrylic Polymer (1) | 28.4 | 41.1 | 38.8 |
| Epoxy Acrylic Polymer (2) | 17.0 | 24.7 | 23.2 |

| -continued | | | |
|---|---|---|---|
| CLEAR COATING COMPOSITIONS | | | |
| | Weight Percent | | |
| Component | A | B | C |
| Hydroxyl Acrylic Polymer (3) | 33.2 | — | — |
| Hydroxyl Polyester Polymer (4) | — | — | 6.3 |
| Hydroxyl Polyester Polymer (5) | — | — | 3.7 |
| Ruco Flex F-2311 (Esterification product of adipic acid, neopentyl glycol and a polyhydric alcohol sold by Ruco Corp.) | — | 7.6 | — |
| N-Methyl Imidazole | 0.1 | 0.8 | 0.7 |
| Methyl Isoamyl Ketone | 4.1 | 6.0 | 5.6 |
| Methyl Isobutyl Ketone | 9.1 | 7.0 | 7.5 |
| Diisobutyl Ketone | 2.7 | 4.0 | 3.7 |
| Xylene | — | 4.0 | 3.7 |
| Butyl Propionate | 3.4 | 1.9 | 4.1 |
| Flow Control Package | 2.0 | 2.9 | 2.7 |
| Total | 100.0 | 100.0 | 100.0 |

The table below shows the Zahn #2 cup viscosity measurements at 20° C. over a four hour period for the clear coating compositions A, B and C. In these compositions, it is important to use the low molecular weight hydroxyl polyester polymers inorder to obtain initial viscosities below 22 seconds and maintain a viscosity of less than 29 seconds after 3 hours at ambient temperature. Composition A which used the higher molecular weight Hydroxy Acrylic Polymer (3) showed an increase in viscosity to 45 seconds after 3 hours.

| | Zahn #2 Viscosity (Seconds) | | |
|---|---|---|---|
| | Coating Composition | | |
| Measurement Time | A | B | C |
| Initial | 33 | 21 | 19.5 |
| 1 hour | 36 | 21.5 | 20 |
| 2 hours | 40.5 | 26 | 23.5 |
| 3 hours | 45 | 27.5 | 26 |
| 4 hours | 56 | 37 | 32 |

Other properties of each of the finishes were tested such as time to become tack free, hardness, flexibility and water resistance and were acceptable for an automotive qualify finish.

A second set of clear coating compositions were made by blending the anhydride and epoxy resin acrylic polymers described above with a hydroxyl resin or blend of hydroxyl resins and a tertiary amine catalyst. Clear coating compositions D-H were formulated at 44.7% solids.

| CLEAR COATING COMPOSITIONS | | | | | |
|---|---|---|---|---|---|
| | Weight Percent | | | | |
| Component | D | E | F | G | H |
| Anhydride Acrylic Polymer (1) | 36.6 | 33.5 | 38.5 | 35.0 | 35.1 |
| Epoxy Acrylic Polymer (2) | 23.7 | 21.7 | 25.0 | 22.8 | 24.0 |
| Hydroxyl Acrylic Polymer (3) | — | — | — | 4.5 | 2.0 |
| Hydroxyl Polyester Polymer (4) | — | 15.2 | — | — | 2.5 |
| Hydroxyl Polyester Polymer (6) | 9.6 | — | — | 8.3 | 6.3 |
| Ruco Flex F-2311 (described above) | — | — | 7.7 | — | — |
| Imidazole | 0.6 | 0.5 | 0.6 | 0.6 | 0.8 |
| Methyl Isoamyl Ketone | 5.7 | 5.3 | 6.0 | 5.5 | 3.2 |
| Methyl Isobutyl Ketone | 7.6 | 7.0 | 8.0 | 7.4 | 17.0 |
| Diisobutyl Ketone | 3.8 | 3.5 | 4.0 | 3.7 | 2.0 |
| Xylene | 3.8 | 3.5 | 4.0 | 3.7 | — |
| Butyl Propionate | 8.6 | 9.8 | 6.2 | 8.5 | 3.9 |
| Flow Control package | — | — | — | — | 1.2 |
| Ultraviolet Light Stabilizer | — | — | — | — | 2.0 |

-continued
CLEAR COATING COMPOSITIONS

| Component | Weight Percent | | | | |
|---|---|---|---|---|---|
| | D | E | F | G | H |
| Total | 100.0 | 100.0 | 100.0 | 100.0 | 100.0 |

The table below shows the Zahn #2 cup viscosity measurements over a four hour period for coating compositions D, E, F, G and H. In these compositions, it is important to use the low molecular weight hydroxyl polymers inorder to obtain initial viscosities below 22 seconds and maintain a viscosity of less than 29 seconds after 2 hours at ambient temperature. A blend of high and lower molecular weight hydroxyl polymers in composition G gave acceptable viscosities up to 2 hours but then the viscosity increased. When only low molecular weight hydroxyl polymers were used, compositions D through F remained low for 3 hours. An acceptable viscosity increase was obtained with composition H that used a blend of high and low molecular weight hydroxyl polymers.

| Measurement Time | Zahn #2 Viscosity (Seconds) | | | | |
|---|---|---|---|---|---|
| | D | E | F | G | H |
| Initial | 20 | 21 | 21 | 21 | 22 |
| 1 hour | 20.5 | 22 | 22.5 | 24 | 23.5 |
| 2 hours | 26.4 | 24 | 27 | 32 | 27 |
| 3 hours | 33 | 25.5 | 30 | 42 | 30 |
| 4 hours | 40 | 26 | 32.5 | 57 | 35.5 |

Other properties of each of the finishes were tested such as time to become tack free, hardness, flexibility and water spot resistance and adhesion and were acceptable for an automotive quality finish.

Coating compositions B-F, made with hydroxy polyesters having a weight average molecular weight with in the range of 650-1600 had a low viscosity when mixed for spray application of less than 22 seconds measured with a #2 Zahn cup at 20° C. and increased in viscosity to less than 33 seconds in 3 hours. In comparison coating compositions A and G made with a higher molecular weight hydroxy polymer increased in viscosity to 45 seconds and 42 seconds respectively in the same period of time which requires the compositions to be reduced with solvent to achieve an acceptable spray viscosity and thereby increases the VOC of the coating compositions.

All compositions cured rapidly after application and had good film properties such as high gloss, good weatherability and good solvent resistance.

EXAMPLE 2

A set of clear coating compositions were produced by combining the anhydride acrylic polymer, epoxy acrylic polymer, prepared in Example 1 with varying mixtures of an acrylic hydroxyl resin and polyester hydroxyl resins. The coating compositions are shown as clear coatings, I, J, K and L and were formulated to be at 44.7% solids with approximate equivalents ratios of anhydride:epoxy:hydroxyl of 1:1.2:0.9.

CLEARCOAT COMPOSITIONS

| Component | Weight Percent | | | |
|---|---|---|---|---|
| | I | J | K | L |
| Anhydride Acrylic Polymer (1) | 33.9 | 33.9 | 33.9 | 33.9 |
| Epoxy Acrylic Polymer (2) | 24.8 | 24.8 | 24.8 | 24.8 |
| Hydroxyl Acrylic Polymer (3) | 40.5 | 15.0 | 4.0 | — |
| Hydroxyl Polyester Polymer (6) | — | 5.6 | 8.0 | 8.9 |
| N-Methyl Imidazole | 0.9 | 0.9 | 0.9 | 0.9 |
| UV Stabilizers | 1.0 | 1.0 | 1.0 | 1.0 |
| Flow Control Package | 0.1 | 0.1 | 0.1 | 0.1 |
| Propylene Glycol Monomethyl Ether Acetate | 5.1 | 5.1 | 5.1 | 5.1 |
| Methyl Isoamyl Ketone | 4.0 | 4.8 | 4.0 | 4.0 |
| Methyl Isobutyl Ketone | 18.1 | 17.1 | 16.7 | 16.6 |
| Diisobutyl Ketone | 2.0 | 2.0 | 2.0 | 2.0 |
| Total | 130.4 | 109.5 | 100.5 | 97.3 |

The table below shows the Zahn #2 cup viscosity measurements recorded over a four hour period, Cotton Free Times and Flexibility values for the coating compositions of coating compositions I, J, K and L. Compositions K and L show it was important to use the low molecular weight hydroxyl polyester and little or no hydroxyl acrylic polymer in order to obtain initial viscosities of 22 seconds and maintain a viscosity of less than 29 seconds after 2 hours at ambient temperature. Compositions K and J show the advantage of introducing some hydroxyl acrylic polymer. The cotton free time is decreased and there is a minimal impact on viscosity and flexibility.

| Measurement Time | Zahn #2 Viscosity (Seconds) | | | |
|---|---|---|---|---|
| | I | J | K | L |
| Initial | 35.0 | 25.0 | 22.0 | 22.0 |
| 1 hour | 54.5 | 31.0 | 25.5 | 24.0 |
| 2 hours | 77.0 | 34.0 | 28.0 | 26.5 |
| 3 hours | 103 | 37.0 | 32.0 | 29.0 |
| 4 hours | >180 | 41.0 | 36.0 | 32.5 |
| Cotton Free time | 9 min | 13 min | 14 min | 16 min |
| Flexibility | 1 Day | 2 Days | 4 Days | 4 Days |

Cotton Free Time is measured by drawing down a 5 mil film of the clear over a steel panel and then dropping a cotton ball on the film surface periodically. The panel is immediately inverted and the time is recorded when the film has dried sufficiently for the cotton ball to drop off the film surface. Flexibility was measured by spraying the clear over a primed and basecoated 4"×12" RIM panel. The panel is bent, until the long ends touch, every day and the number of days after spraying is recorded when the paint cracks. Other properties of these finishes were tested such as film clarity and hardness and were acceptable for an automotive quality finish.

I claim:

1. A coating composition comprising about 30-70% by weight of a reactive film forming binder and 70-30% by weight of an organic liquid carrier: wherein the binder comprises about
   (a) 25-90% by weight, based on the weight of the binder, of an anhydride acrylic polymer having at least two reactive anhydride groups and consists of polymerized monomers of an ethylenically unsaturated anhydride or an ethylenically unsaturated dicarboxylic acid and polymerized monomers selected from the group consisting of alkyl methacrylate, alkyl acrylate, styrene and any mixtures thereof, wherein the alkyl groups have 1-12 carbon atoms and the polymer has a weight average molecular weight of about 2,000-50,000;
(b) 5-50% by weight, based on the weight of the binder, of a polymeric glycidyl component having at least two reactive glycidyl groups;
(c) 5-50% by weight, based on the weight of the binder, of hydroxyl containing polymeric component selected from the group consisting of a polyester polyol or a polyester urethane having a weight average molecular weight of about 500-2,500; and the composition contains about 0.5-5% by weight, based on the weight of the binder, of a catalyst; wherein components (a), (b) and (c) are three separate components.

2. The coating composition of claim 1 in which the polymeric glycidyl component comprises a polymer of glycidyl methacrylate or glycidyl acrylate and an alkyl methacrylate having 1-12 carbon atoms in the alkyl group and has a weight average molecular weight of about 4,000-7,000.

3. The coating composition of claim 1 in which the anhydride acrylic polymer has a glass transition temperature of 0° to 90° C. and a weight average molecular weight of about 3,000-25,000.

4. The coating composition of claim 3 in which the anhydride acrylic polymer consists essentially of 20-50% by weight, based on the weight of the acrylic polymer of methyl methacrylate, styrene or mixture of methyl methacrylate and styrene, 25-55% by weight of alkyl methacrylate, alkyl acrylate or any mixtures thereof each having 1-12 carbon atoms in the alkyl group and 5-55% by weight of polymerizable ethylenically unsaturated anhydride.

5. The coating composition of claim 1 in which the hydroxyl containing polymeric component component is a polyester polyol having an average hydroxyl functionality per molecule of 2-4.

6. The coating composition of claim 5 in which the polyester polyol is the reaction product of a lactone and a diol or dialkanol.

7. The coating composition of claim 6 in which the polyester polyol is the reaction product of caprolactone and cyclohexane dimethanol.

8. The coating composition of claim 5 in which the polyester is the reaction product of an alkylene glycol, a polyhydric alcohol having at least three hydroxyl groups and an aromatic or alpihatic dicarboxylic acid or its anhydride.

9. The coating composition of claim 8 in which the polyester is the reaction product of pentaerythritol, benzoic acid, neopentyl glycol, isophthalic acid, adipic acid, and phthalic anhydride.

10. The coating composition of claim 1 in which the hydroxyl containing polymeric component is a polyester urethane which is the reaction product of a polyisocyanate and a polyester which is the esterification product of an alkylene glycol, a polyhydric alcohol having at least three hydroxyl groups and an aromatic dicarboxylic acid or its anhydride.

11. The coating composition of claim 1 in which the anhydride acrylic polymer consists of the polymerization product of maleic anhydride, butyl acrylate, methyl acrylate and styrene; the polymeric glycidyl component consists of the polymerization products of glycidyl methacrylate and butyl methacrylate and the hydroxyl containing polymeric component is a polyester polyol of carprolactone and cyclohexane dimethanol and a polyester polyol of pentaerythritol, benzoic acid, neopentyl glycol, isophthalic acid, adipic acid and phthalic anhydride.

12. A substrate coated with a pigmented basecoat and a clearcoat in adherence to the base coat wherein the clear coat is a cured layer of the composition of claim 1.

* * * * *